(12) United States Patent
Faccin

(10) Patent No.: US 9,344,958 B1
(45) Date of Patent: *May 17, 2016

(54) SYSTEM AND METHOD FOR PROVIDING CONNECTIVITY BETWEEN A VISITED NETWORK AND A HOME NETWORK

(71) Applicant: Marvell International LTD., Hamilton (BM)

(72) Inventor: Stefano Faccin, Hayward, CA (US)

(73) Assignee: Marvell International LTD., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 14/833,828

(22) Filed: Aug. 24, 2015

Related U.S. Application Data

(63) Continuation of application No. 13/893,849, filed on May 14, 2013, now Pat. No. 9,119,137, which is a continuation of application No. 12/009,725, filed on Jan. 22, 2008, now Pat. No. 8,442,011.

(60) Provisional application No. 60/886,813, filed on Jan. 26, 2007.

(51) Int. Cl.
*H04L 1/00* (2006.01)
*H04W 48/00* (2009.01)
*H04W 8/08* (2009.01)
*H04L 29/12* (2006.01)

(52) U.S. Cl.
CPC ............. *H04W 48/17* (2013.01); *H04L 61/203* (2013.01); *H04W 8/082* (2013.01)

(58) Field of Classification Search
CPC .... H04B 7/2628; H04B 7/2629; H04B 7/263; H04B 7/2631; H04B 7/2643; H04B 7/2644; H04B 7/2645

USPC .................................................. 370/335, 338
See application file for complete search history.

(56) References Cited

U.S. PATENT DOCUMENTS

| | | |
|---|---|---|
| 2005/0125314 A1 | 6/2005 | Agarwal et al. |
| 2005/0129032 A1 | 6/2005 | Kim et al. |
| 2006/0018291 A1 | 1/2006 | Patel et al. |

(Continued)

OTHER PUBLICATIONS

Mobility Management using Proxy Mobile IPv4; draft-leung-mip4-proxy-mode-02.txt; Leung, et al.; Jan. 10, 2007; 15 pages.

(Continued)

*Primary Examiner* — Dady Chery

(57) ABSTRACT

A system including a first home agent and a proxy mobility agent. The first home agent receives a first binding update message from an attachment point configured to communicate with a wireless terminal, and generates a trigger signal in response to receiving the first binding update message. In response to receiving the trigger signal from the first home agent, the proxy mobility agent transmits a second binding update message to a second home agent; receives, in response to transmitting the second binding update message, a first binding acknowledgement message from the second home agent including an internet protocol (IP) address assigned to the wireless terminal by the second home agent; and forwards the IP address from the first binding acknowledgement message to the first home agent. The first home agent transmits a second binding acknowledgement message to the attachment point including the IP address assigned to the wireless terminal.

18 Claims, 14 Drawing Sheets

(56) References Cited

U.S. PATENT DOCUMENTS

2007/0008906 A1 1/2007 Han et al.
2007/0214283 A1 9/2007 Metke et al.

OTHER PUBLICATIONS

Proxy Mobile IPv6; draft-sgundave-mip6-proxymip6-01; Gundavelli, et al.; Jan. 5, 2007; 37 pages.
WiMax Forum/3GPP2 Proxy Mobile IPv4; draft-leung-mip4-proxy-mode.4.txt; Leung, et al.; Sep. 20, 2007; 38 pages.

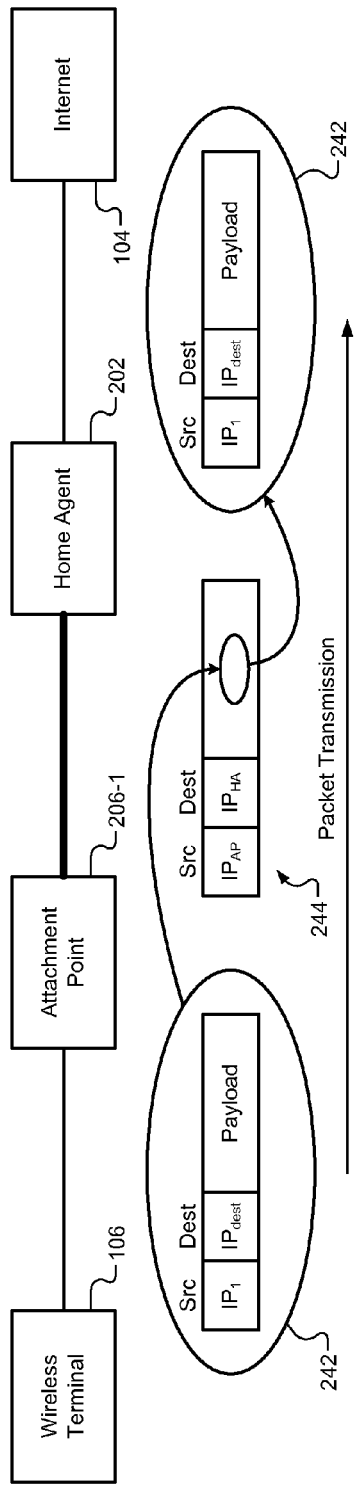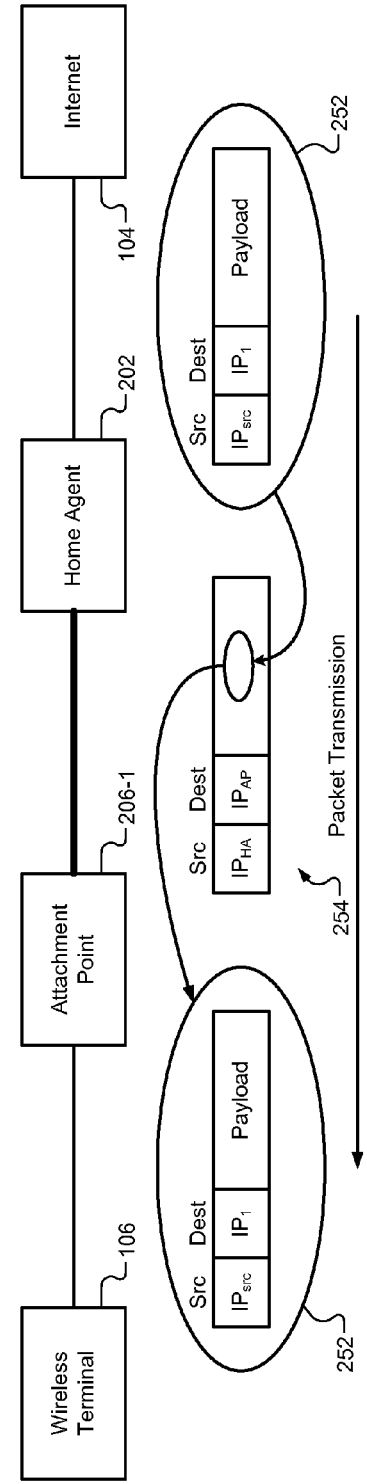
FIG. 6
Prior Art
FIG. 7
Prior Art

SYSTEM AND METHOD FOR PROVIDING CONNECTIVITY BETWEEN A VISITED NETWORK AND A HOME NETWORK

CROSS-REFERENCE TO RELATED APPLICATIONS

This is a continuation of U.S. patent application Ser. No. 13/893,849 (now U.S. Pat. No. 9,119,137), filed May 14, 2013, which is a continuation of U.S. patent application Ser. No. 12/009,725 (now U.S. Pat. No. 8,442,011), filed on Jan. 22, 2008, which claims the benefit of U.S. Provisional Application No. 60/886,813, filed on Jan. 26, 2007. The entire disclosures of the above applications are incorporated herein by reference.

FIELD

The present disclosure relates to mobile networking and more particularly to using a proxy to provide mobility to a mobile terminal.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of a wireless communications system is presented. A home network 102 receives packets from and sends packets to a distributed communications system 104, such as the Internet. A wireless terminal 106 wirelessly connects to the home network 102. For example, the wireless terminal 106 may be a mobile phone, and the home network 102 may be the cellular network of a mobile phone operator. The wireless terminal 106 is configured to work with the home network 102, and may be unable connect to the networks of other carriers. In various implementations, the wireless terminal 106 may be able to view content from the Internet 104 via the home network 102. The home network 102 may also interconnect with the networks of other service providers.

Referring now to FIG. 2, a functional block diagram of a wireless communications system offering mobility is presented. The home network 102 is connected to one or more visited networks 110. For example only, FIG. 2 depicts three visited networks 110-1, 110-2 and 110-3. In various implementations, the visited networks 110 may be the networks of other service providers, including service providers in other countries.

A mobile wireless terminal 120 includes mobility features that allow it to communicate with the visited networks 110. For example, in FIG. 2, the mobile wireless terminal 120 has established a wireless connection to the visited network 110-1. The mobile wireless terminal 120 includes the code and data used to communicate with the home network 102 via the visited network 110-1. In this way, the mobile wireless terminal 120 can interface with the home network 102 even when connected to one of the visited networks 110.

Referring now to FIG. 3, a functional block diagram depicts a wireless communications system that provides proxy mobility to the wireless terminal 106. A home network 150 communicates with visited networks 160-1, 160-2, and 160-3. The visited networks 160 provide transparent mobility to wireless terminals, such as the wireless terminal 106, that have not been updated to include mobility functionality.

When the wireless terminal 106 attempts to establish a link with the visited network 160-1, the visited network 160-1 determines the network to which the wireless terminal 106 belongs. In this case, the visited network 160-1 determines that the home network 150 is the appropriate network. The visited network 160-1 then forwards packets from the wireless terminal 106 to the home network 150 and passes packets from the home network 150 to the wireless terminal 106. The wireless terminal 106 is therefore oblivious to the fact that it is connected to the visited network 160-1 instead of to the home network 150.

Referring now to FIG. 4, a more detailed functional block diagram of an implementation of proxy mobility is presented. Proxy mobility may also be referred to as network-based mobility because the network provides mobility to a terminal that does not have built-in mobility. In an Internet Protocol (IP) network, proxy mobility may be referred to as proxy mobile IP (PMIP). The home network 150 includes a home agent 202. The home agent 202 establishes the logical location of the wireless terminal 106. Packets destined for the wireless terminal 106 are first sent to the home agent 202, while packets from the wireless terminal 106 will appear to originate from the home agent 202.

The wireless terminal 106 may establish a connection to an attachment point 206-1 within the visited network 160-1. In various implementations, additional attachment points, such as attachment points 206-2 and 206-3, may be present. The attachment points 206 may communicate with other networks, including the home network 150, via a gateway 210.

Referring now to FIG. 5, a timeline of steps performed when the wireless terminal 106 connects to the visited network 160-1 is presented. First, the wireless terminal 106 performs access and authentication with the attachment point 206-1. This may include communicating with an Access, Authentication, and Accounting (AAA) server. Upon authentication, the wireless terminal 106 attempts to attach to the attachment point 206-1.

The AAA server may use an identifier of the wireless terminal 106, such as a network address identifier, that uniquely identifies the wireless terminal 106. The attachment point requests an IP address from the attachment point 206-1. The attachment point 206-1 determines the appropriate home agent for the wireless terminal 106. This information may be supplied by the wireless terminal 106 and/or may be supplied by the source of the authentication information.

The attachment point 206-1 then sends a binding update message to the home agent 202. The home agent 202 allocates an IP address, $IP_1$, to the wireless terminal 106. The address $IP_1$ is used for communications with the wireless terminal 106. When the wireless terminal 106 sends a packet, that packet will appear to originate from the home agent 202 with a source address of $IP_1$. In addition, packets destined for the wireless terminal 106 are sent to the home agent 202 with a destination of $IP_1$.

The home agent 202 sends a binding acknowledgement message including $IP_1$ to the attachment point 206-1. A tunnel is then set up between the attachment point 206-1 and the home agent 202 for transmission of packets to and from the wireless terminal 106. The attachment point 206-1 then assigns $IP_1$ to the wireless terminal 106. In this process, the wireless terminal 106 has requested an IP address from the attachment point 206-1 and has received one. The wireless terminal 106 is not, and does not need to be, aware that it is connected to the visited network 160.

Referring now to FIGS. 6 and 7, a packet being sent by the wireless terminal 106 and a packet being sent to the wireless terminal 106, respectively, are graphically depicted. Referring now to FIG. 6, a packet 242 is transmitted to the wireless terminal 106. The source of the packet 242 is $IP_1$, the IP address assigned to the wireless terminal 106. The destination of the packet 242 is the IP address, denoted $IP_{dest}$, to which the wireless terminal 106 is sending the packet 242. The packet 242 may also include a payload.

The packet 242 is received by the attachment point 206-1. The attachment point 206-1 tunnels the packet 242 to the home agent 202. The packet 242 is tunneled by encapsulating it within an encapsulating packet 244. The header and payload of the packet 242 is placed in the payload of the encapsulating packet 244. The encapsulating packet 242 has a source address of the attachment point 206-1, $IP_{AP}$, and a destination address of the home agent 202, $IP_{HA}$.

When the home agent 202 receives the encapsulating packet 244, the home agent 202 extracts the original packet 242 from the payload of the encapsulating packet 244. The packet 242 is then routed to the destination indicated by $IP_{dest}$. For example only, this may be an address on the Internet 104.

Referring now to FIG. 7, a packet 252 is received by the home agent 202 for the wireless terminal 106. The packet 252 has a source address of the sender of the packet 252, designated $IP_{src}$. The destination address of the packet 252 is the address assigned to the wireless terminal 106, $IP_1$. The home agent 202 recognizes the destination address of $IP_1$ and tunnels the packet 252 to the attachment point 206-1.

The packet 252 may be tunneled by encapsulating it within the payload of an encapsulating packet 254. The source address of the encapsulating packet 254 is the address of the home agent 202, $IP_{HA}$. The destination of the encapsulating packet 254 is the address of the attachment point 206-1, $IP_{AP}$. The attachment point 206-1 extracts the packet 252 from the payload of the encapsulating packet 254 and forwards the packet 252 to the wireless terminal 106.

SUMMARY

A networking system comprises a proxy mobility agent (PMA) module, and a home agent (HA) module. The PMA module sends a first binding update message including a unique identifier to a remote HA based on a trigger signal. The unique identifier identifies a mobile terminal associated with the remote PMA. The HA module receives a second binding update message including the unique identifier from a remote PMA, and selectively sends the trigger signal to the PMA module based on the second binding update message.

In other features, the PMA module receives a first binding acknowledgement including an assigned internet protocol (IP) address from the remote HA and transmits the assigned IP address to the HA module. After the assigned IP address is received, the HA module sends a second binding acknowledgement including the assigned IP address to the remote PMA. After the assigned IP address is received, the HA module establishes a tunnel with the remote PMA. After the first binding acknowledgement is received, the PMA module establishes a tunnel with the remote HA.

In further features, either the PMA module or the HA module allocates an allocated IP address to the remote PMA. When the PMA module receives a packet with a destination address corresponding to the allocated IP address, the HA module forwards the packet to the remote PMA. The networking system further comprises a memory storing a mapping from allocated IP address to PMA address. Either the PMA module or the HA module allocates an allocated IP address to the mobile terminal.

In still other features, when the PMA module receives a packet with a destination address corresponding to the allocated IP address, the HA module forwards the packet to the remote PMA. The networking system further comprises a memory storing a mapping from allocated IP address to PMA address. The HA module receives an address of the remote HA from the remote PMA. Either the HA module or the PMA module determines an address of the remote HA. The address of the remote HA is determined based on the unique identifier.

In other features, the address of the remote HA is determined from an authentication server. The address of the remote HA is determined from a domain name system (DNS) query based on a logical name. The logical name is received from the remote PMA. The HA module sends the trigger signal to the PMA module when the second binding update message includes an augmented identifier including the unique identifier. The augmented identifier includes an HA identifier. Either the HA module or the PMA module resolves the HA identifier to an address of the remote HA.

In further features, the HA module sends the trigger signal to the PMA module when the second binding update message includes a predetermined indicator. The HA module determines an HA identifier for the mobile terminal and sends the trigger signal to the PMA module when the HA identifier differs from an address of the HA module. The HA module determines the HA identifier based on the unique identifier.

A method of controlling a networking system comprises receiving a first binding update from a remote proxy mobility agent (PMA) including a unique identifier, where the unique identifier identifies a mobile terminal associated with the remote PMA; selectively generating a trigger signal based on the first binding update; and transmitting a second binding update including the unique identifier to a remote home agent (HA) based on the trigger signal.

In other features, the method further comprises receiving a first binding acknowledgement including an assigned internet protocol (IP) address from the remote HA. The method further comprises sending a second binding acknowledgement including the assigned IP address to the remote PMA. The method further comprises establishing a tunnel with the remote PMA after receiving the assigned IP address. The method further comprises establishing a tunnel with the remote HA after receiving the first binding acknowledgement. The method further comprises allocating an allocated IP address to the remote PMA.

In further features, the method further comprises receiving a packet with a destination address corresponding to the allocated IP address; and forwarding the packet to the remote PMA. The method further comprises storing a mapping from allocated IP address to PMA address. The method further comprises allocating an allocated IP address to the mobile terminal. The method further comprises receiving a packet with a destination address corresponding to the allocated IP address; and forwarding the packet to the remote PMA.

In still other features, the method further comprises storing a mapping from allocated IP address to PMA address. The method further comprises receiving an address of the remote HA from the remote PMA. The method further comprises determining an address of the remote HA. The method further comprises determining the address of the remote HA based on the unique identifier. The method further comprises determining the address of the remote HA from an authentication server.

In other features, the method further comprises determining the address of the remote HA by performing a domain name system (DNS) query based on a logical name. The method further comprises receiving the logical name from the remote PMA. The method further comprises generating the trigger signal when the first binding update includes an augmented identifier including the unique identifier. The augmented identifier includes an HA identifier. The method further comprises resolving the HA identifier to an address of the remote HA.

In further features, the method further comprises generating the trigger signal when the first binding update includes a predetermined indicator. The method further comprises determining an HA identifier for the mobile terminal; and generating the trigger signal when the HA identifier differs from an address of the HA module. The method further comprises determining the HA identifier based on the unique identifier.

A computer program stored on a computer-readable medium for use by a processor for operating a networking system comprises receiving a first binding update from a remote proxy mobility agent (PMA) including a unique identifier, where the unique identifier identifies a mobile terminal associated with the remote PMA; selectively generating a trigger signal based on the first binding update; and transmitting a second binding update including the unique identifier to a remote home agent (HA) based on the trigger signal.

In other features, the computer program further comprises receiving a first binding acknowledgement including an assigned internet protocol (IP) address from the remote HA. The computer program further comprises sending a second binding acknowledgement including the assigned IP address to the remote PMA. The computer program further comprises establishing a tunnel with the remote PMA after receiving the assigned IP address. The computer program further comprises establishing a tunnel with the remote HA after receiving the first binding acknowledgement. The computer program further comprises allocating an allocated IP address to the remote PMA.

In further features, the computer program further comprises receiving a packet with a destination address corresponding to the allocated IP address; and forwarding the packet to the remote PMA. The computer program further comprises storing a mapping from allocated IP address to PMA address. The computer program further comprises allocating an allocated IP address to the mobile terminal. The computer program further comprises receiving a packet with a destination address corresponding to the allocated IP address; and forwarding the packet to the remote PMA.

In still other features, the computer program further comprises storing a mapping from allocated IP address to PMA address. The computer program further comprises receiving an address of the remote HA from the remote PMA. The computer program further comprises determining an address of the remote HA. The computer program further comprises determining the address of the remote HA based on the unique identifier. The computer program further comprises determining the address of the remote HA from an authentication server.

In still other features, the computer program further comprises determining the address of the remote HA by performing a domain name system (DNS) query based on a logical name. The computer program further comprises receiving the logical name from the remote PMA. The computer program further comprises generating the trigger signal when the first binding update includes an augmented identifier including the unique identifier. The augmented identifier includes an HA identifier. The computer program further comprises resolving the HA identifier to an address of the remote HA.

In other features, the computer program further comprises generating the trigger signal when the first binding update includes a predetermined indicator. The computer program further comprises determining an HA identifier for the mobile terminal; and generating the trigger signal when the HA identifier differs from an address of the HA module. The computer program further comprises determining the HA identifier based on the unique identifier.

A networking system comprises proxy mobility agent (PMA) means for sending a first binding update message including a unique identifier to a remote home agent (HA) based on a trigger signal; and HA means for receiving a second binding update message from a remote PMA including the unique identifier, and for selectively sending the trigger signal to the PMA means based on the second binding update message. The unique identifier identifies a mobile terminal associated with the remote PMA.

In other features, the PMA means receives a first binding acknowledgement including an assigned internet protocol (IP) address from the remote HA and transmits the assigned IP address to the HA means. After the assigned IP address is received, the HA means sends a second binding acknowledgement including the assigned IP address to the remote PMA. After the assigned IP address is received, the HA means establishes a tunnel with the remote PMA. After the first binding acknowledgement is received, the PMA means establishes a tunnel with the remote HA.

In further features, either the PMA means or the HA means allocates an allocated IP address to the remote PMA. When the PMA means receives a packet with a destination address corresponding to the allocated IP address, the HA means forwards the packet to the remote PMA. The networking system further comprises memory means for storing a mapping from allocated IP address to PMA address. Either the PMA means or the HA means allocates an allocated IP address to the mobile terminal. When the PMA means receives a packet with a destination address corresponding to the allocated IP address, the HA means forwards the packet to the remote PMA.

In still other features, the networking system further comprises memory means for storing a mapping from allocated IP address to PMA address. The HA means receives an address of the remote HA from the remote PMA. Either the HA means or the PMA means determines an address of the remote HA. The address of the remote HA is determined based on the unique identifier. The address of the remote HA is determined from an authentication server.

In other features, the address of the remote HA is determined from a domain name system (DNS) query based on a logical name. The logical name is received from the remote PMA. The HA means sends the trigger signal to the PMA means when the second binding update message includes an augmented identifier including the unique identifier. The augmented identifier includes an HA identifier. Either the HA means or the PMA means resolves the HA identifier to an address of the remote HA.

The HA means sends the trigger signal to the PMA means when the second binding update message includes a predetermined indicator. The HA means determines an HA identifier for the mobile terminal and sends the trigger signal to the PMA means when the HA identifier differs from an address of the HA means. The HA means determines the HA identifier based on the unique identifier.

In still other features, the systems and methods described above are implemented by a computer program executed by one or more processors. The computer program can reside on a computer readable medium such as but not limited to memory, non-volatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 6 and 7 are graphical depictions of a packet being sent by and sent to a wireless terminal, respectively according to the prior art;

DETAILED DESCRIPTION

Figure 1:
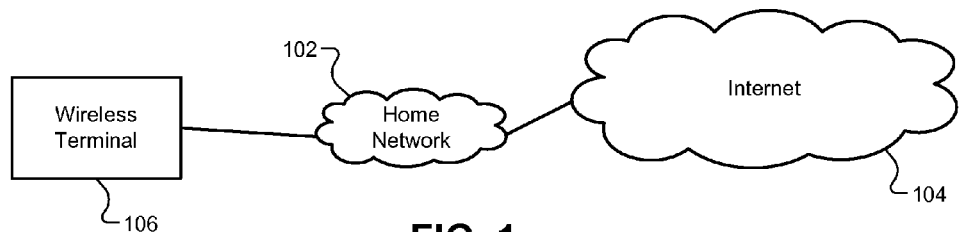
FIG. 1 is a functional block diagram of a wireless communications system according to the prior art.
Figure 2:
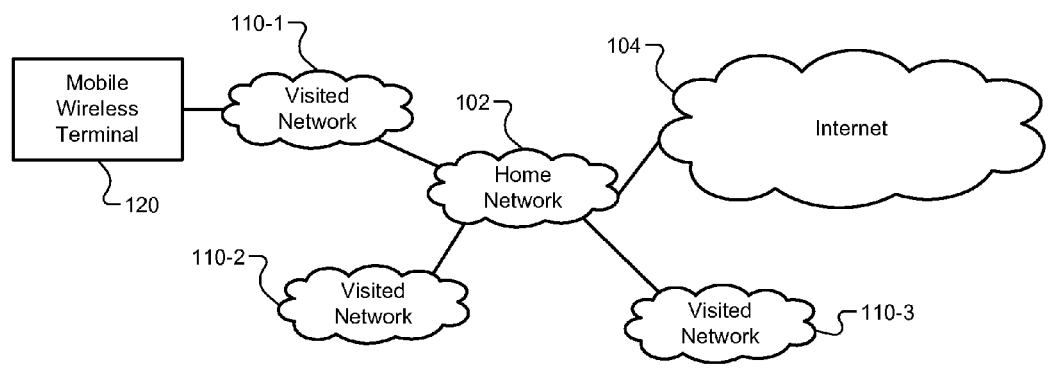
FIG. 2 is a functional block diagram of a wireless communications system offering mobility according to the prior art.
Figure 3:
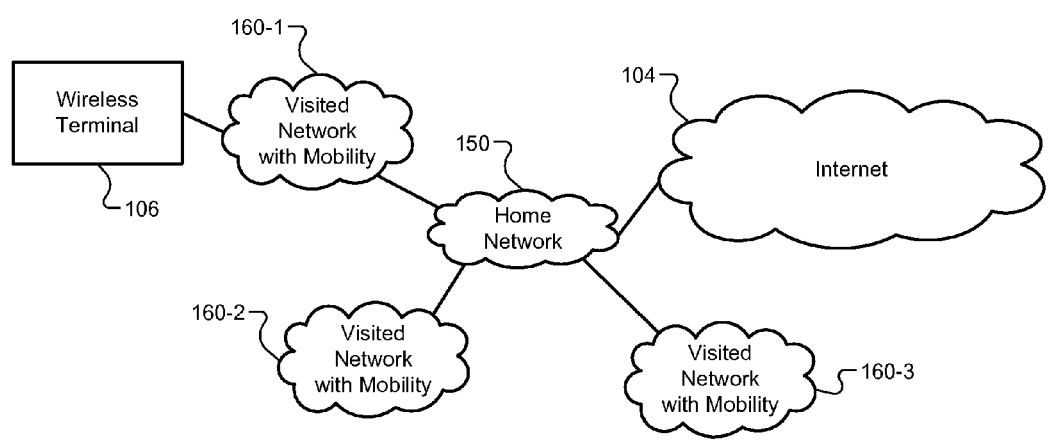
FIG. 3 is a functional block diagram of a wireless communications system that provides proxy mobility to a wireless terminal according to the prior art.
Figure 4:
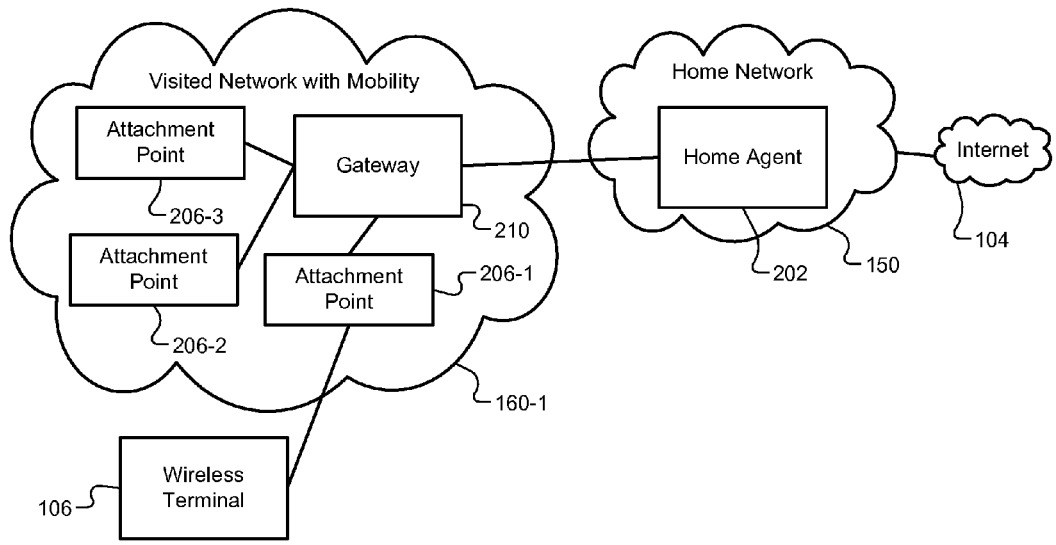
FIG. 4 is a more detailed functional block diagram of an implementation of proxy mobility according to the prior art.
Figure 5:
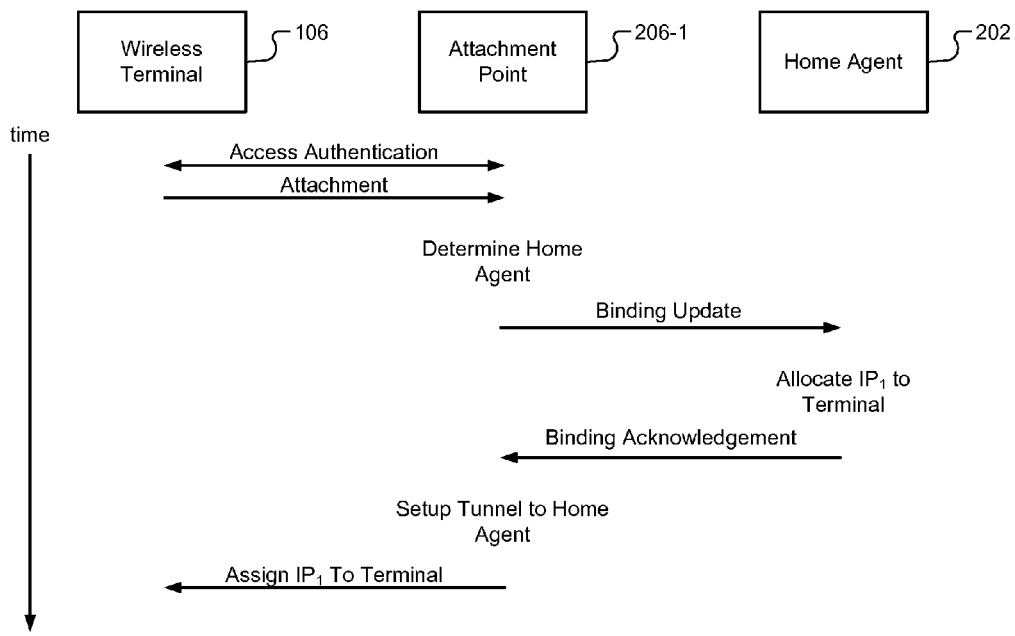
FIG. 5 is a timeline of steps performed when a wireless terminal connects to a visited network according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, and/or a combinational logic circuit.

Figure 8:
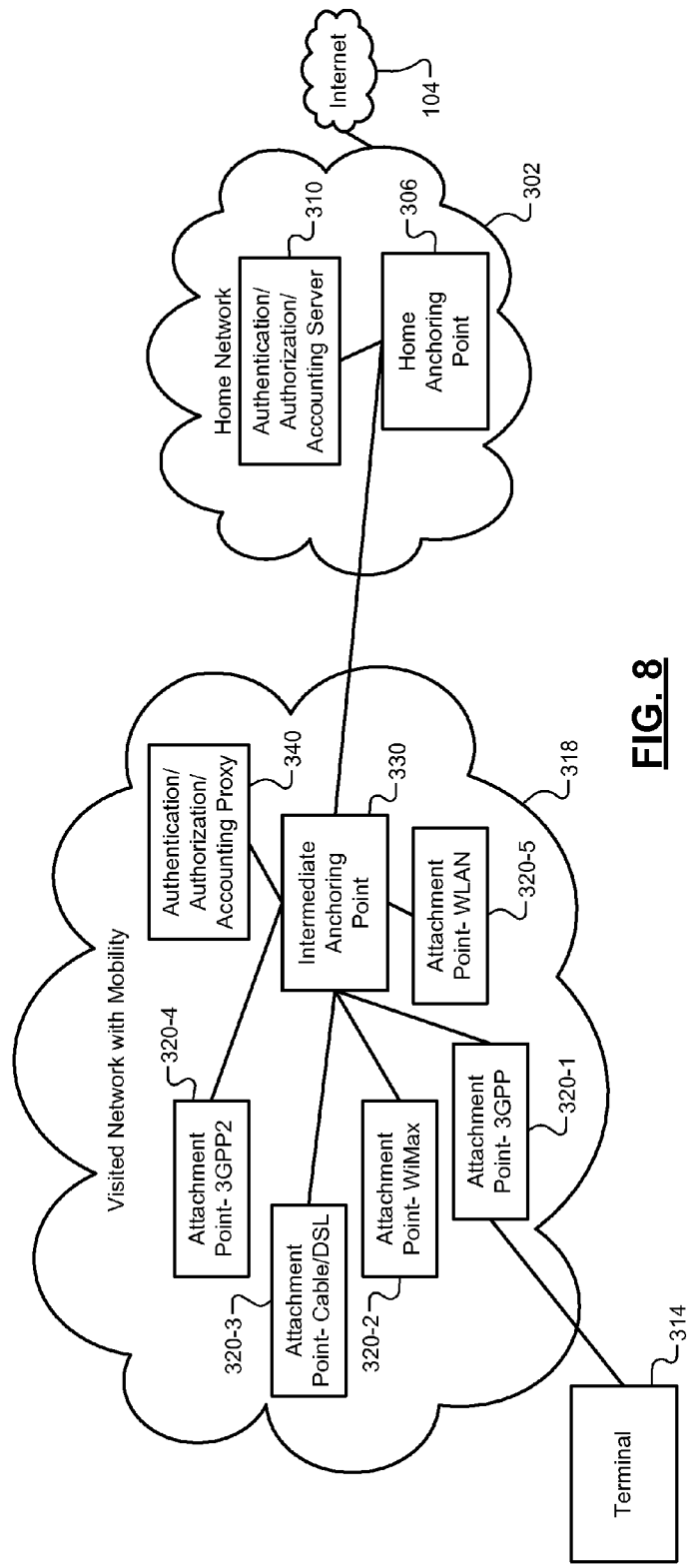
FIG. 8 is a functional block diagram of an exemplary implementation of a hierarchical proxy mobility architecture according to the principles of the present disclosure.

Referring now to FIG. 8, a functional block diagram depicts an exemplary implementation of a hierarchical proxy mobility architecture according to the principles of the present disclosure. A home network 302 includes a home anchoring point 306 and an authentication/authorization/accounting (AAA) server 310. A terminal 314, which may include a mobile device such as a mobile phone, connects to a visited network 318.

The visited network 318 includes one or more attachment points 320. For example only, five attachment points 320-1, 320-2, 320-3, 320-4, and 320-5 are shown. The attachment points 320 may include any suitable wireless or wired interface. For example only, the attachment point 320-1 may include a $3^{rd}$ Generation Partnership Project (3GPP) interface. The attachment point 320-1 may use the Universal Mobile Telecommunications System (UMTS) and/or a Long Term Evolution (LTE) Radio Access Network (RAN).

For example only, the attachment point 320-2 may include a Worldwide interoperability for Microwave Access (WiMAX) interface. For example only, the attachment point 320-3 may include a wired interface, such as a cable modem or a Digital Subscriber Line (DSL). For example only, the attachment point 320-4 may include a $3^{rd}$ Generation Partnership Project 2 (3GPP2) interface, which may use Code Division Multiple Access 2000 (CDMA2000). For example only, the attachment point 320-5 may include a Wireless Local Area Network (WLAN) interface.

The attachment points 320 may communicate with other networks, such as the home network 302, via an intermediate anchoring point 330. The intermediate anchoring point 330 may also include switching and routing functionality to allow the attachment points 320 to communicate between each other. The visited network 318 may include an AAA proxy 340, which connects to the AAA server 310 of the home network 302.

For example only, the terminal 314 is shown connected to the attachment point 320-1. When the terminal 314 initiates the connection with the attachment point 320-1, the attachment point 320-1 determines whether the terminal 314 is authorized by querying the AAA proxy 340. The AAA proxy 340 may identify the AAA server 310 based on identification information from the terminal 314, and request authorization information from the AAA server 310.

The AAA proxy 340 may cache this data, such as for a specified period of time or for as long as the terminal 314 is connected to one of the attachment points 320 of the visited network 318. In addition, the AAA server 310 may provide an expiration time for this authorization information. The authorization information may include whether the terminal 314 is authorized to connect to the visited network 318, what services the terminal 314 should be offered, and what quality of service the terminal 314 should be guaranteed.

In various implementations, the AAA proxy 340 may provide the address of the AAA server 310 to the attachment point 320-1, which then queries the AAA server 310 directly. Access and authorization may be provided by any suitable method, including a Home Subscriber System (HSS).

Assuming that the terminal 314 is authorized to attach, a first tunnel is created between the attachment point 320-1 and the intermediate anchoring point 330. A second tunnel is created between the intermediate anchoring point 330 and the home anchoring point 306. If the terminal 314 switches from the attachment point 320-1 to another of the attachment points 320, or to another 3GPP attachment point (not shown), only the first tunnel will be modified.

The second tunnel, from the intermediate anchoring point 330 to the home anchoring point 306, can remain unchanged. This may present a significant time savings when the visiting network 318 and the home network 302 are physically separated by a great distance. For example, creating a new intercontinental tunnel may incur a delay on the order of seconds.

Figure 9:
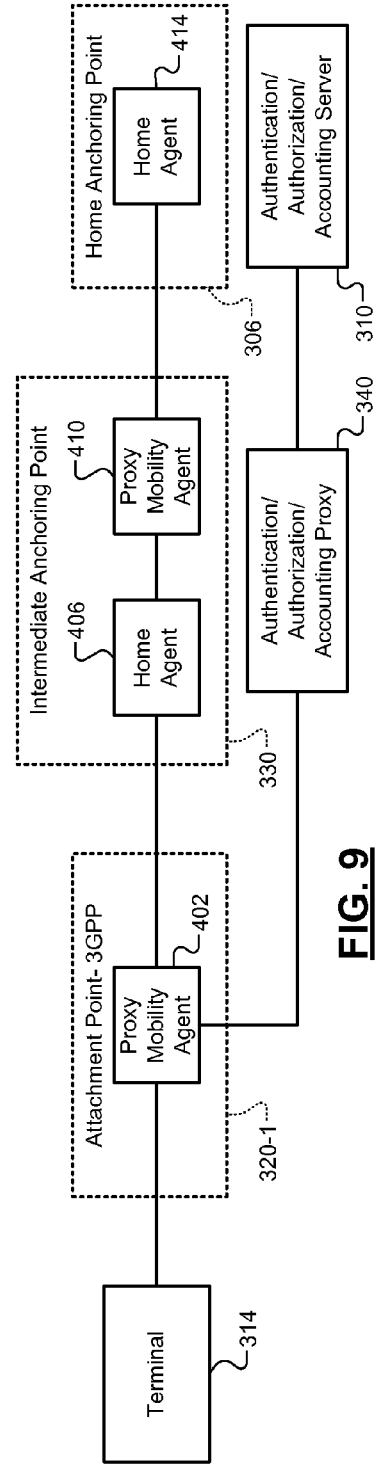
FIG. 9 is a more detailed functional block diagram of an exemplary implementation of hierarchical proxy mobility for a single attachment point.
Figure 10:
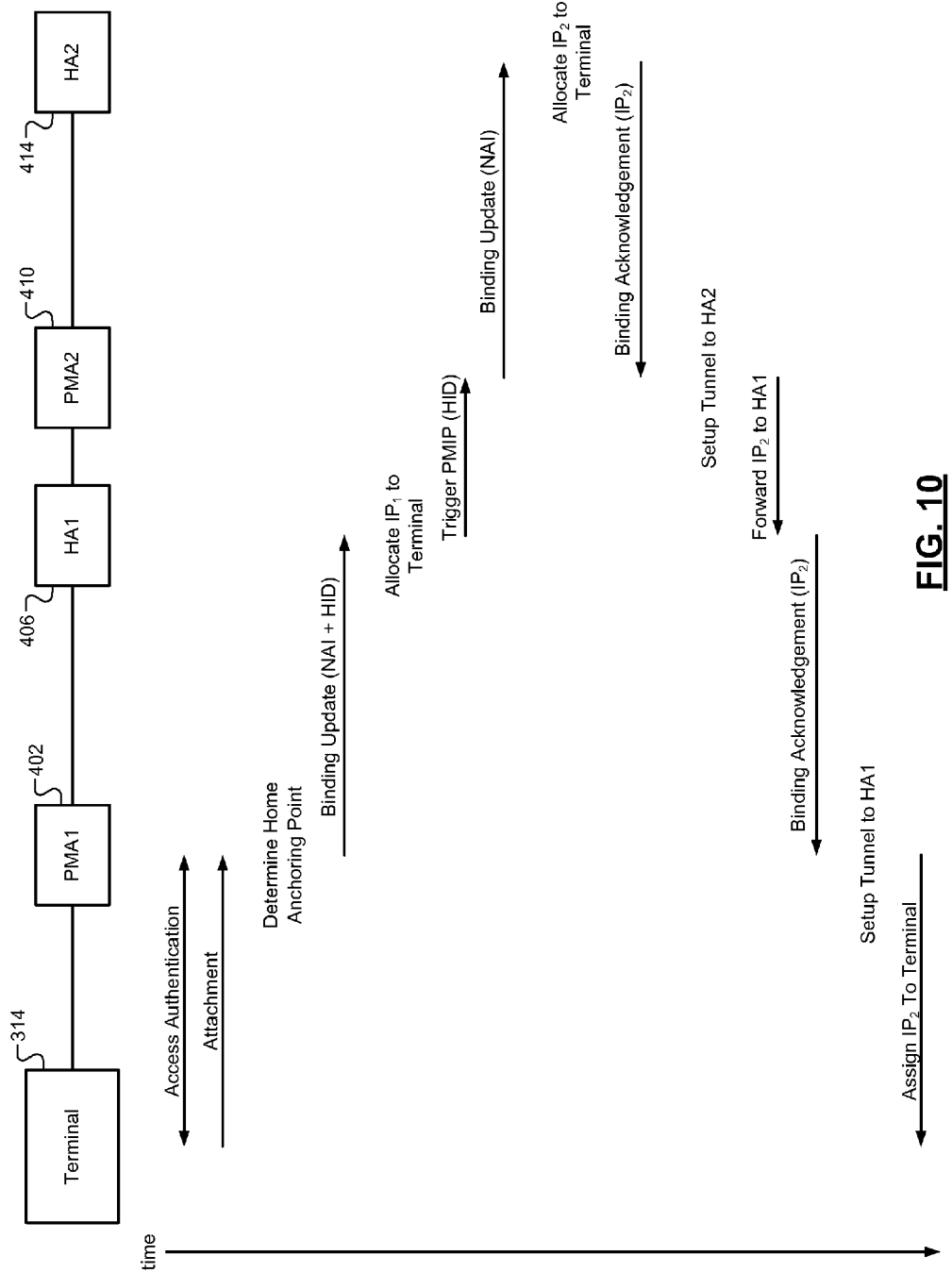
FIG. 10 is an exemplary timeline of attachment of a wireless terminal.
Figure 11A:
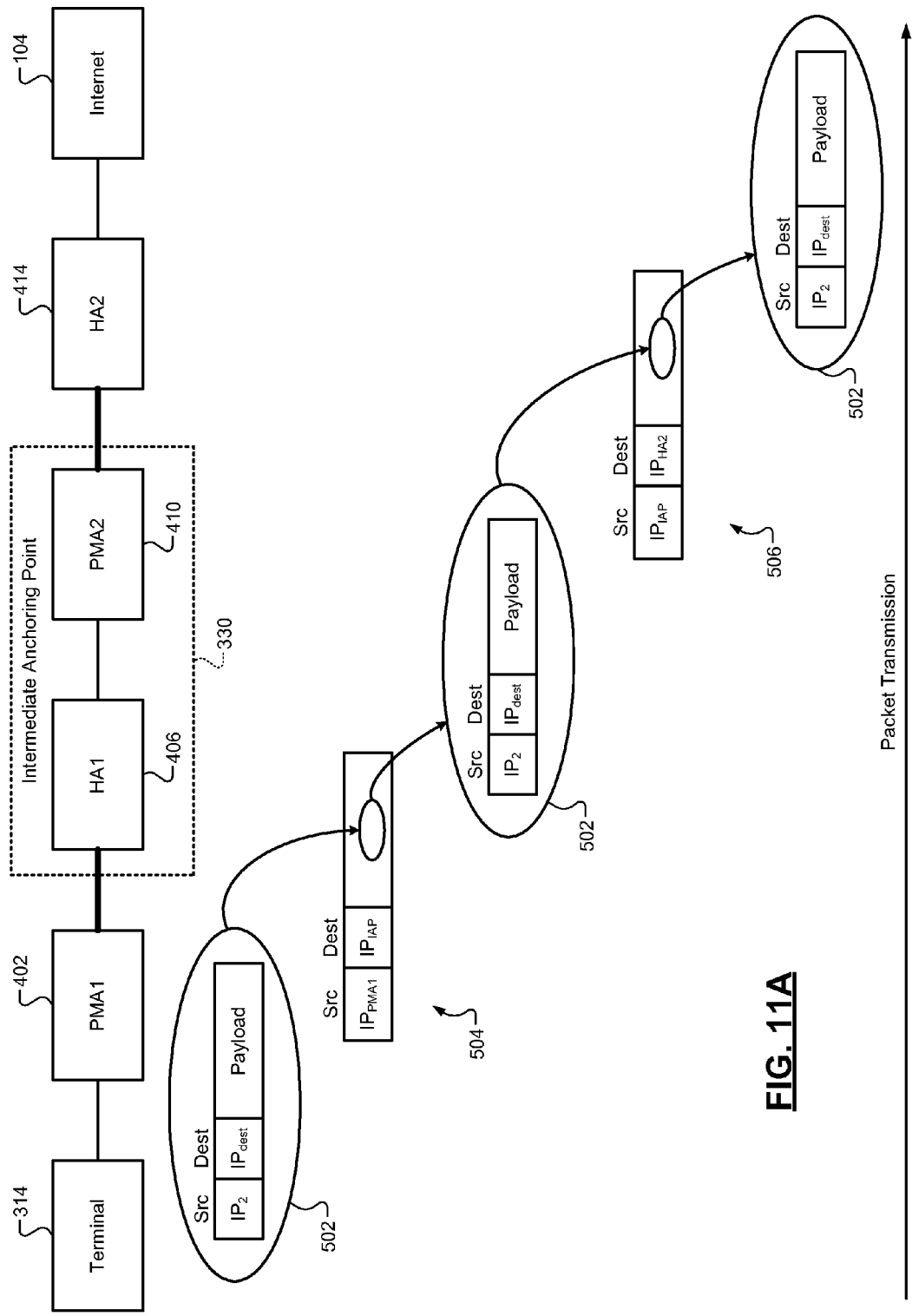
FIGS. 11A and 12A are exemplary graphical depictions of transmission of a packet from the wireless terminal.
Figure 11B:
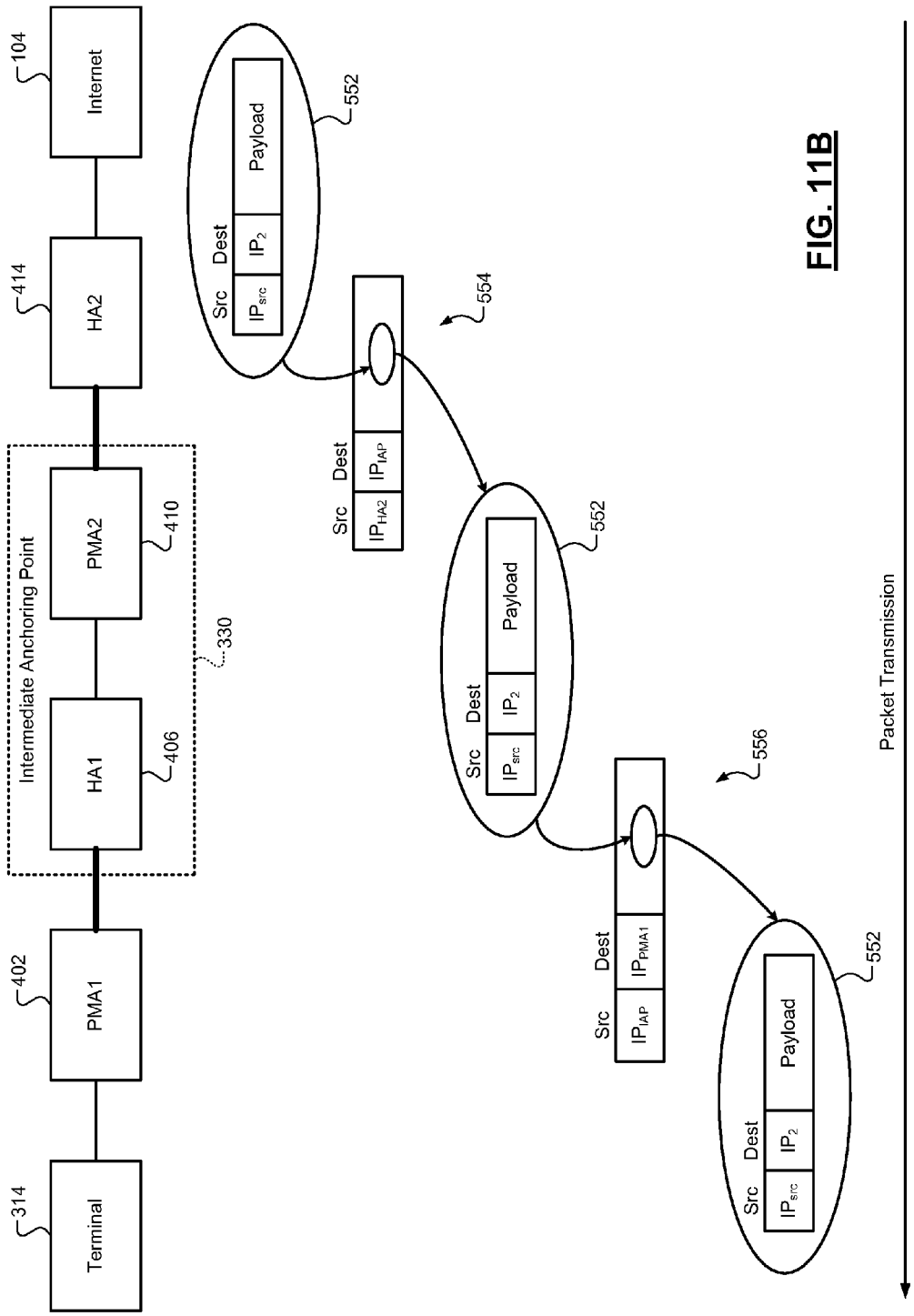
FIGS. 11B and 12B are exemplary graphical depictions of transmission of a packet to the wireless terminal.
Figure 12A:
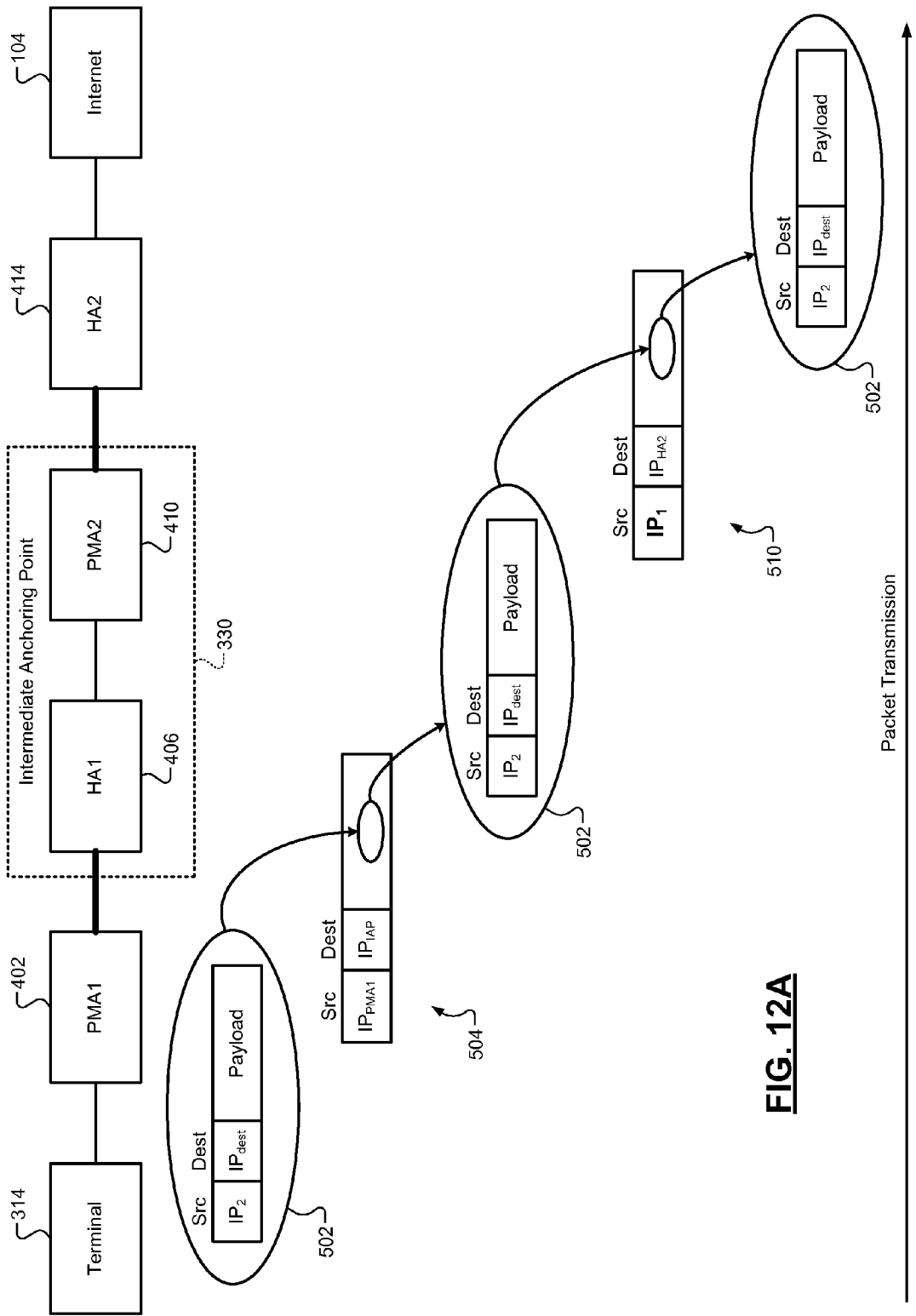
Figure 12B:
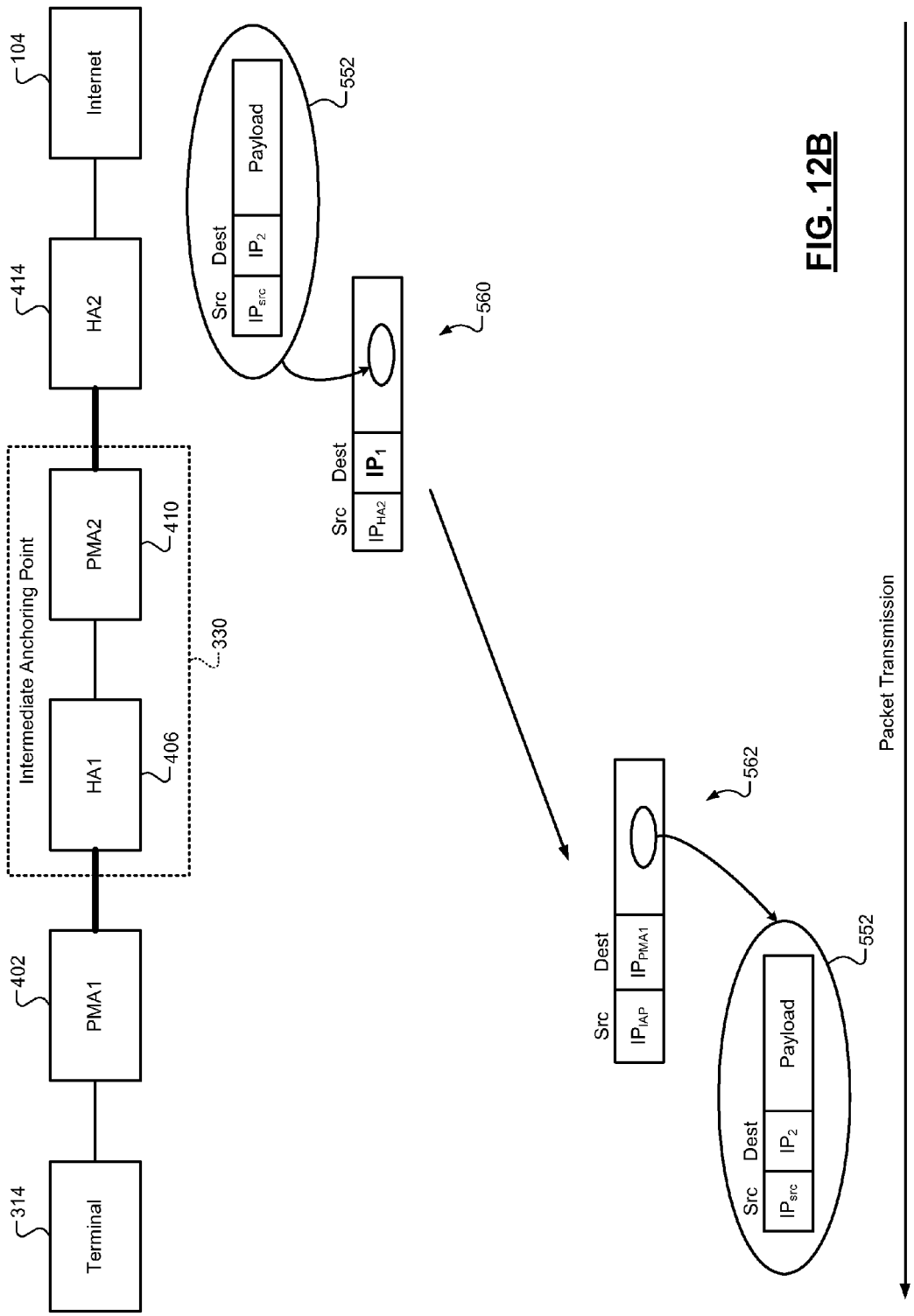
Figure 13A:
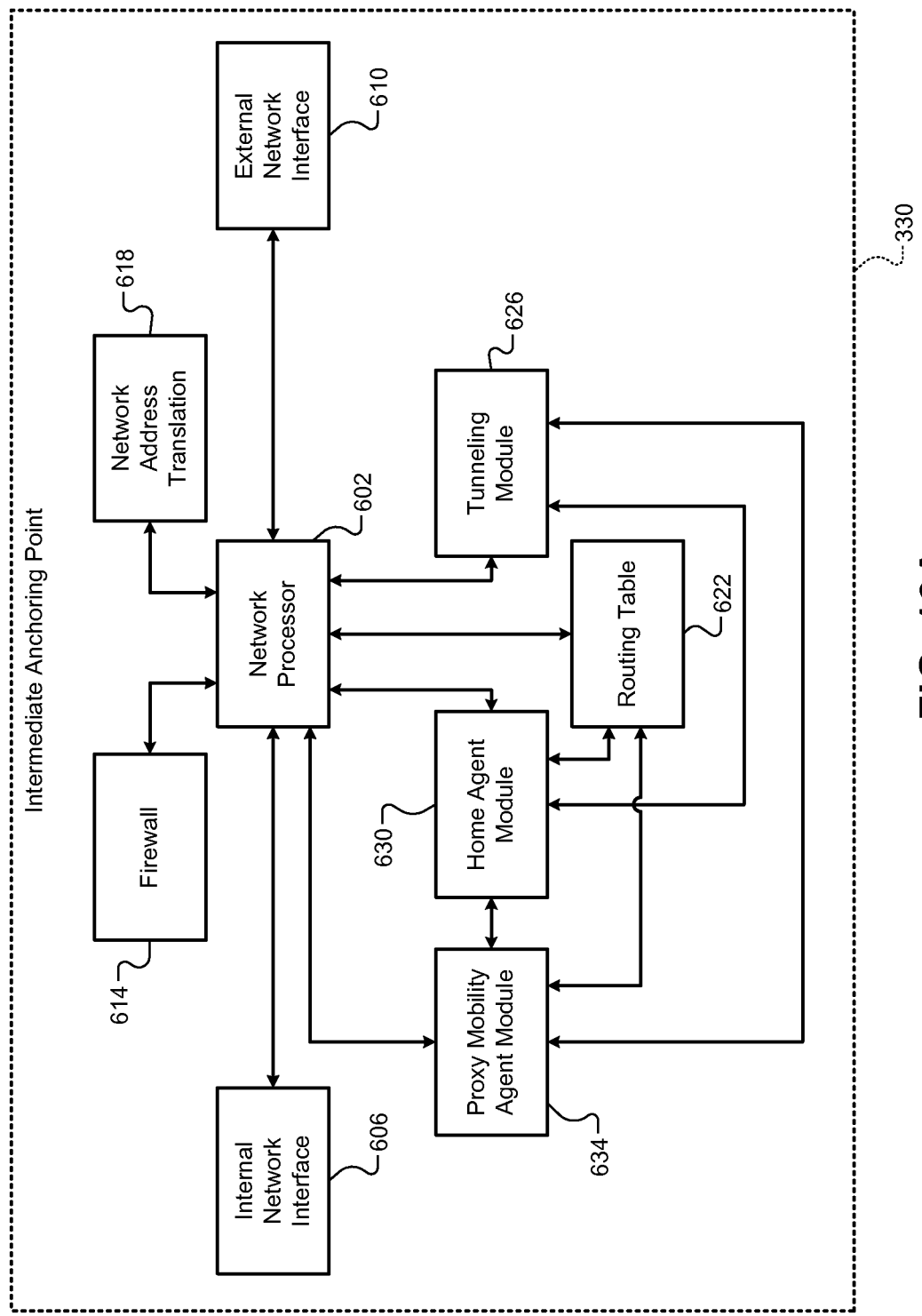
FIGS. 13A-13B are functional block diagrams of exemplary implementations of the intermediate anchoring point.
Figure 13B:
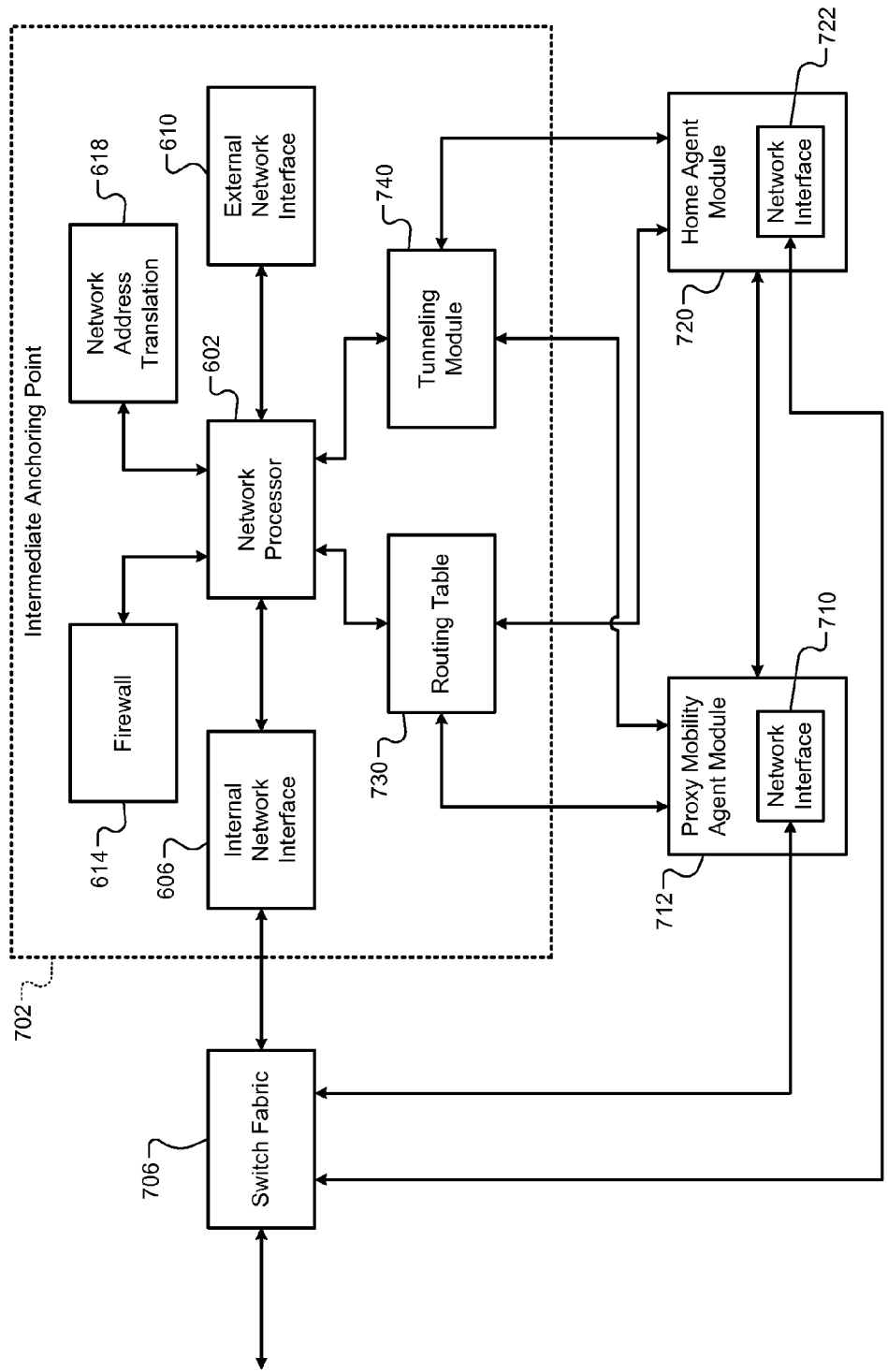
Figure 14:
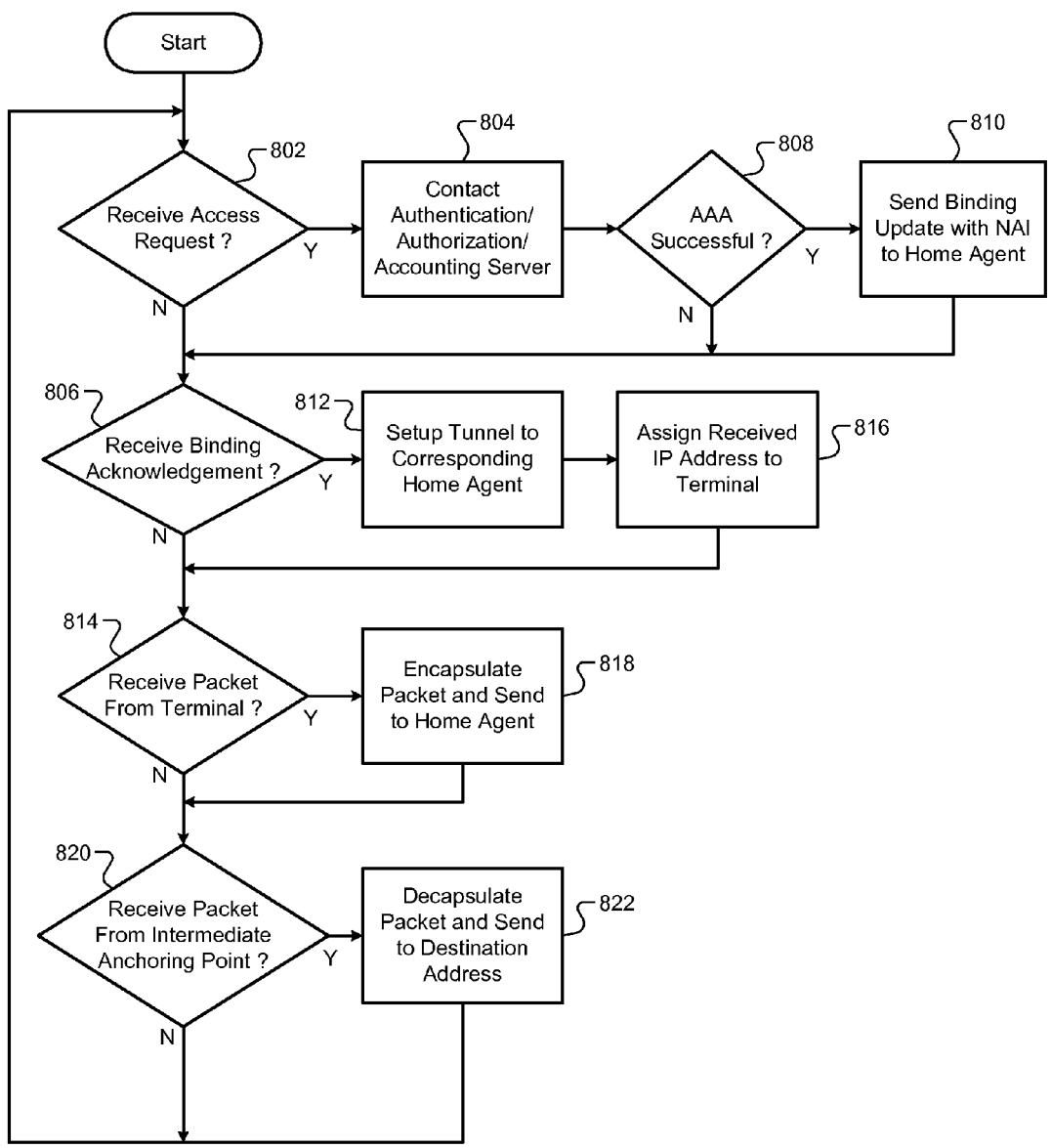
FIG. 14 is a flowchart depicting exemplary steps performed by an attachment point.
Figure 15A:
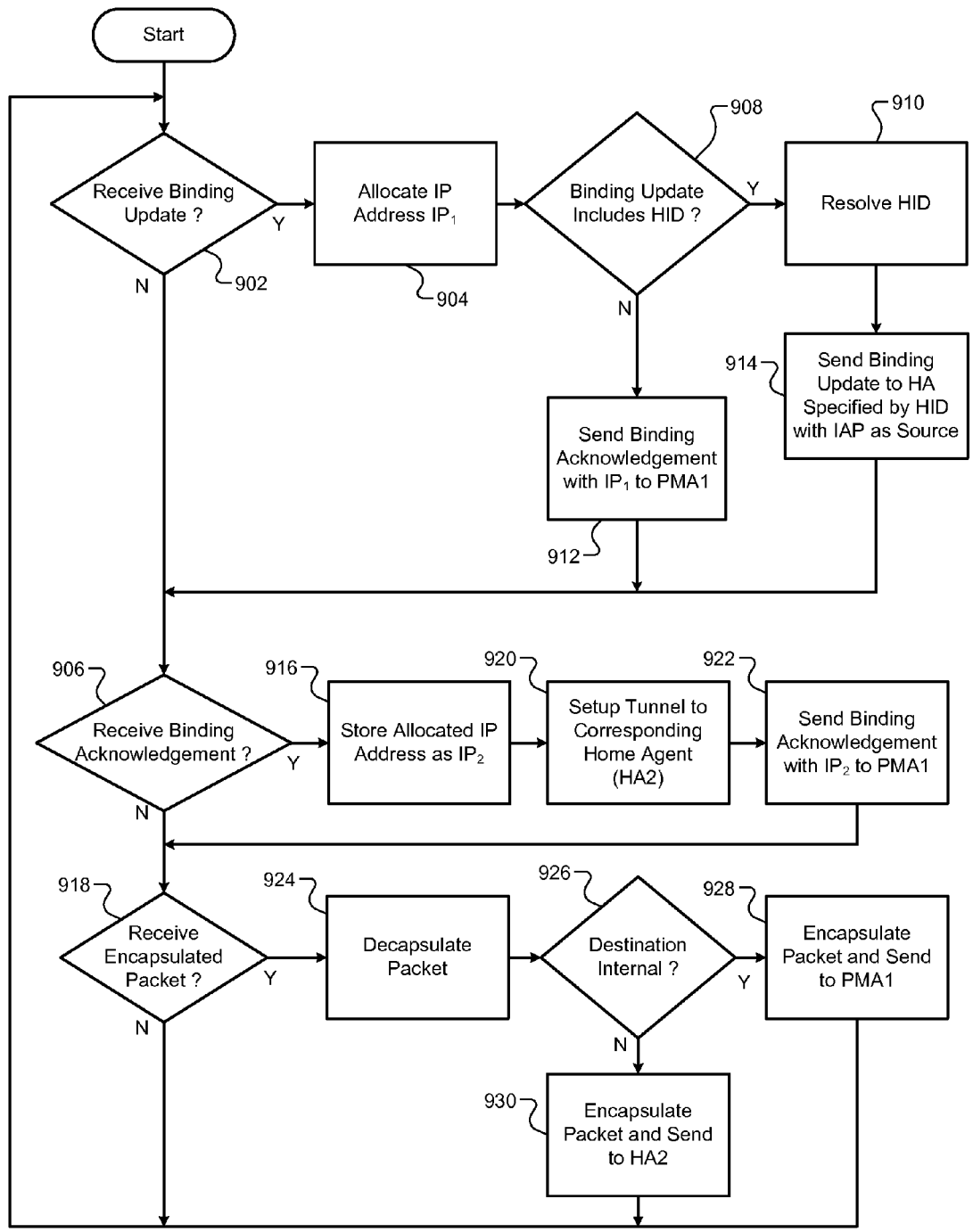
FIGS. 15A-15B are flowcharts depicting exemplary steps performed by an intermediate anchoring point.
Figure 15B:
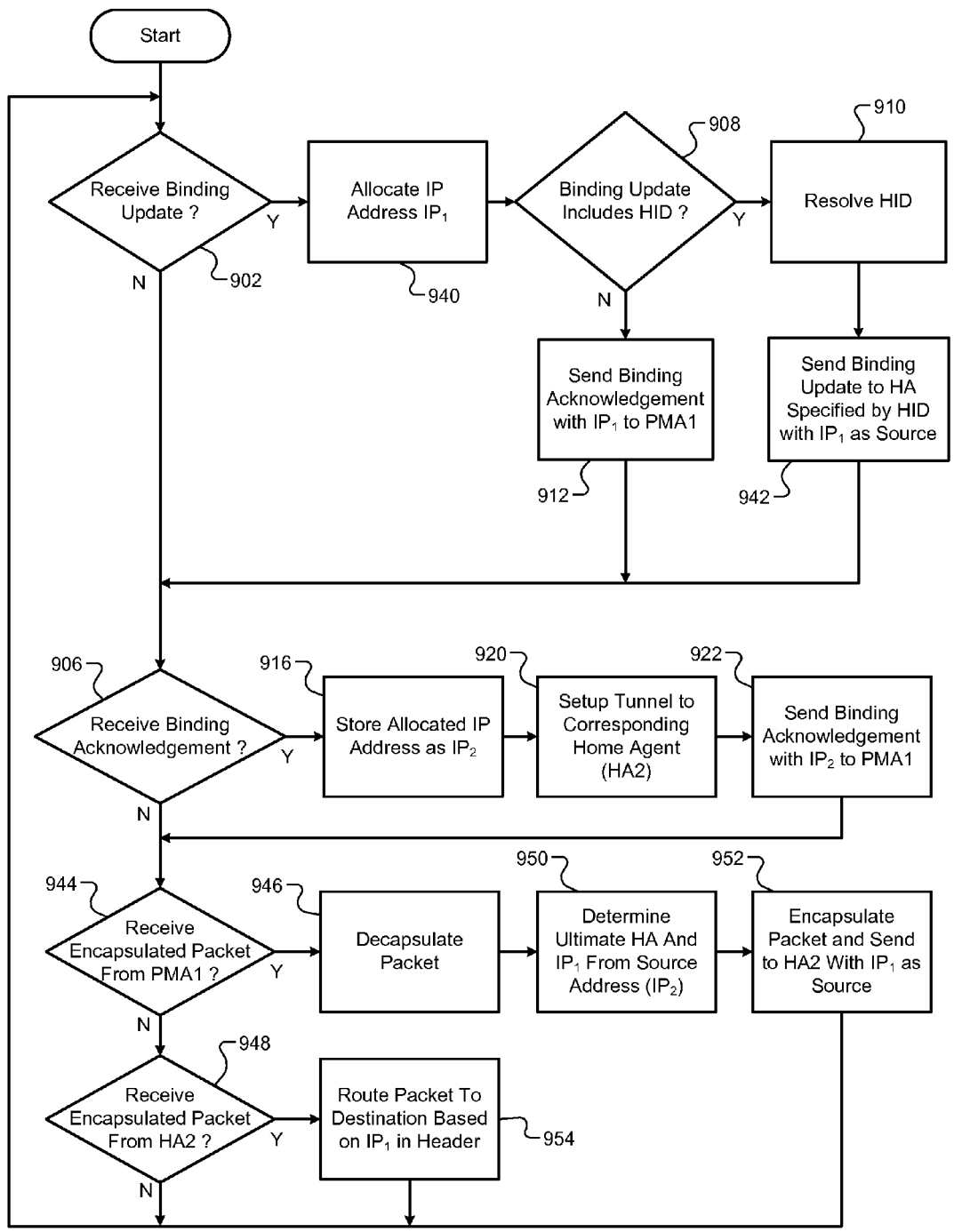

As an overview, FIG. 9 depicts a more detailed functional block diagram of an exemplary implementation of hierarchical proxy mobility for a single attachment point. FIG. 10 depicts an exemplary timeline of attachment of a wireless terminal. FIGS. 11A and 12A depict exemplary ways of transmitting a packet from the wireless terminal, while FIGS. 11B and 12B depict exemplary ways of transmitting a packet to the wireless terminal. FIGS. 13A and 13B depict exemplary implementations of the intermediate anchoring point 330. FIG. 14 depicts exemplary steps performed by the attachment point 320-1, and FIGS. 15A and 15B depict exemplary steps performed by the intermediate anchoring point 330.

Referring now to FIG. 9, the terminal 314 connects to a proxy mobility agent (PMA) 402 of the attachment point 320-1. In various implementations, the PMA 402 may be a part of a user plane entity (UPE), an access service network (ASN) gateway (GW), and/or an electronic packet data gateway (ePDG). The PMA 402 receives identification information from the terminal 314.

This identification information may include, for example, a Network Address Identifier (NAI) and/or an International Mobile Subscriber Identity (IMSI). The identification information is sent to the AAA proxy 340. Based on the identification information, the AAA proxy identifies the appropriate AAA server. In this case, the AAA server 310 is selected. The AAA proxy 340 sends the identification information to the AAA server 310, which returns authentication information to the PMA 402.

Assuming that the terminal 314 is authorized for access, the PMA 402 sends a binding update to a home agent (HA) 406 of the intermediate anchoring point 330. The PMA 402 also transmits information indicating that the HA 406 is not the ultimate home agent of the terminal 314. For example, the binding update may include information designating the ultimate home agent of the terminal 314, which is not the HA 406. The PMA 402 may be pre-programmed with the location of the HA 406.

In various implementations, the terminal 314 and/or the AAA server 310 may provide information identifying the ultimate home agent. The PMA 402 and/or the HA 406 may also resolve the ultimate home agent identification into an address, such as an IP address. In various implementations, the address of the ultimate home agent may be resolved from a logical name using a Domain Name System (DNS) query.

The HA 406 allocates an IP address for the terminal 314, which may be performed in the same manner as when the HA 406 is the ultimate home agent. However, because the HA 406 is not the ultimate home agent, the HA 406 triggers a second PMA 410 of the intermediate anchoring point 330 to contact the ultimate home agent, a second HA 414. The second PMA 410 sends a binding update to the second HA 414. The second HA 414 allocates an IP address, $IP_2$, to the terminal 314. The address $IP_2$ from the second HA 414 is assigned to the terminal 314. Tunnels are then established between the second HA 414 and the second PMA 410, and between the HA 406 and the PMA 402.

Referring now to FIG. 10, an exemplary timeline of a terminal attachment to a visited network is shown. For ease of explanation, the first PMA 402 will be referred to herein as PMA1, the second PMA 410 as PMA2, the first HA 406 as HA1 and the second HA 414 as HA2. The terminal 314 begins access authentication with PMA1. Assuming that authentication is successful, the terminal 314 attempts to attach to PMA1.

PMA1 determines the ultimate home anchoring point of the terminal 314. In various implementations, this may occur during authentication. Additionally, PMA1 may perform a DNS lookup to determine an IP address from ultimate home agent identification information. In various other implementations, HA1 and/or PMA2 may instead perform this function.

PMA1 sends a binding update to HA1, which includes an identifier of the terminal 314 and an identifier of the ultimate home agent. These may be referred to as the network address identifier (NAI) and the home agent identifier (HID), respectively. HA1 allocates address $IP_1$ to the terminal 314. Because HA1 has received the HID, HA1 instructs PMA2 to bind to the ultimate home agent. PMA2 locates the ultimate home agent based on the HID.

In various implementations, the binding update from PMA1 to HA1 may omit the HID. Therefore, HA1 may automatically determine what the ultimate home agent of the terminal 314 is. HA1 may use the NAI of the terminal 314, or a portion of the NAI, to look up the ultimate home agent, such as with an AAA query. The HA1 will then know whether it is the ultimate home agent of the terminal 314. Alternatively, the binding update may include an indication that HA1 is not the ultimate home agent. This may prompt HA1 to determine the ultimate home agent of the terminal 314.

When HA1 determines that it is not the ultimate home agent, it triggers PMA2 to bind to the ultimate home agent. HA1 may provide the address of the ultimate home agent, or PMA2 may determine this information. For example, PMA2 may contact an AAA server and/or a DNS server using the HID.

PMA2 sends a binding update, which includes the NAI, to HA2. HA2 allocates an address, $IP_2$, to the terminal 314. HA2 may store $IP_2$ in a mapping of NAIs and allocated IP addresses. HA2 sends a binding acknowledgement, including $IP_2$, to PMA2. PMA2 and HA2 then set up a tunnel between each other. PMA2 forwards the allocated address $IP_2$ to HA1. HA1 then sends a binding acknowledgment including $IP_2$ to PMA1. PMA1 and HA1 set up a tunnel between each other. PMA1 then assigns the address $IP_2$ to the terminal 314. In various implementations, the attachment request and the address assignment may be performed using a DHCP request and offer, respectively.

Referring now to FIG. 11A, a packet 502 is shown being transmitted by the terminal 314. The packet 502 includes a source address of $IP_2$, which has been assigned to the terminal 314. The destination address, which is routable from HA2, is denoted $IP_{dest}$. The packet 502 may include a payload. The packet 502 is sent to PMA1. PMA1 encapsulates the packet 502 into a payload of a first encapsulating packet 504.

The first encapsulating packet 504 has a source address of PMA1, $IP_{PMA1}$, and a destination address of the intermediate anchoring point 330, $IP_{IAP}$. HA1 extracts the packet 502 from the first encapsulating packet 504. Based on the source address of the packet 502, PMA2 recognizes that the packet 502 should be passed to HA2.

PMA2 encapsulates the packet 502 into a second encapsulating packet 506. The second encapsulating packet 506 has a source address of $IP_{IAP}$ and a destination address of HA2, $IP_{HA2}$. HA2 extracts the packet 502 from the second encapsulating packet 506, and forwards the packet 502 to the noted destination address, $IP_{dest}$. For example, $IP_{dest}$ may be within the Internet 104, within the home network, or within a visited network.

Referring now to FIG. 11B, a packet 552 being transmitted to the terminal 314 is shown. The packet 552 has a destination address of $IP_2$, which has been assigned to the terminal 314.

The packet 552 has a source address designated $IP_{src}$ and may include a payload. When HA2 receives packets with a destination address of $IP_2$, they are tunneled to the terminal 314.

The packet 552 is therefore encapsulated in a payload of a first encapsulating packet 554. The first encapsulating packet 554 has a source address of $IP_{HA2}$ and a destination address of $IP_{IAP}$. PMA2 extracts the packet 552 from the first encapsulating packet 554. Because $IP_2$, the destination address of the packet 552, is associated with PMA1, PMA2 forwards the packet 552 to HA1 for tunneling to PMA1.

HA1 encapsulates the packet 552 into a payload of a second encapsulating packet 556. The second encapsulating packet 556 has a source address of $IP_{IAP}$ and a destination address of $IP_{PMA1}$. PMA1 receives the second encapsulating packet 556 and extracts the packet 552. The packet 552 is then forwarded to the destination address, $IP_2$, which has been assigned to the terminal 314.

Referring now to FIG. 12A, an exemplary timeline depicts forwarding of the packet 502, where the intermediate anchoring point 330 reveals an individualized IP address to HA2. A different second encapsulating packet 510 takes the place of the second encapsulating packet 506 of FIG. 11A. The source address of the second encapsulating packet 510 is $IP_1$, which was allocated by HA1. By specifying $IP_1$ as the source address, HA2 will reply to $IP_1$.

For example, the intermediate anchoring point 330 may allocate IP addresses per terminal and/or per PMA. Then when the intermediate anchoring point 330 receives a packet from HA2, the destination address of the packet may indicate to which PMA or terminal that packet should be forwarded. This will be shown in more detail in FIG. 12B.

Referring now to FIG. 12B, an exemplary timeline depicts the packet 552 being transmitted to the terminal 314, where the intermediate anchoring point 330 has revealed an address of $IP_1$ to HA2. HA2 encapsulates the packet 552 into a payload of a first encapsulating packet 560. The first encapsulating packet 560 has a source address of $IP_{HA2}$ and a destination address of $IP_1$, which was received from PMA2.

When PMA2 receives the first encapsulating packet 560, PMA2 parses the header of the first encapsulating packet 560 to find the destination address, which is $IP_1$ in this example. PMA1 can then reference a lookup table using $IP_1$. $IP_1$ may correspond to a specific PMA or to a specific terminal. If $IP_1$ corresponds to a specific terminal, a mapping of terminals to PMA can be used to determine the correct PMA. If $IP_1$ corresponds to a specific PMA, the first encapsulating packet 560 can be sent to that PMA.

PMA2 or HA1 can then modify the header of the first encapsulating packet 560 to produce a second encapsulating packet 562. The destination address of the second encapsulating packet 562 is the PMA indicated by $IP_1$. HA1 then tunnels the second encapsulating packet 562 to the PMA1 402. The second encapsulating packet therefore has a source address of $IP_{IAP}$ and a destination address of $IP_{PMA1}$. By using $IP_1$ to identify incoming packets, PMA2 may not need to extract the packet 552 in order to forward the first encapsulating packet 560.

Referring now to FIG. 13A, a functional block diagram of an exemplary implementation of the intermediate anchoring point 330 is presented. The intermediate anchoring point 330 includes a network processor 602, which communicates with an internal network interface 606 and an external network interface 610. The internal network interface 606 communicates with other elements within the network housing the intermediate anchoring point 330, which is referred to as the visited network.

The external network interface 610 communicates with other networks and with the network designated as the home network. The network processor 602 may communicate with a firewall module 614 and with a Network Address Translation (NAT) module. The network processor 602 may make routing decisions using a routing table 622.

A tunneling module 626 may establish tunnels within the visited network and with external networks, such as the home network. In addition, the tunneling module 626 may perform encapsulation and decapsulation of packets. The routing table 622 may be updated by a home agent (HA) module 630 and a proxy mobility agent (PMA) module 634.

For example, the HA module 630 may receive binding updates, allocate IP addresses, trigger hierarchical proxy mobility, set up tunnels, and transmit binding acknowledgments. The PMA module 634 may transmit binding updates, receive binding acknowledgements, set up tunnels, and forward IP addresses.

The HA module 630 and the PMA module 634 may communicate with each other to relay information for hierarchical proxy mobility. For example, the information transferred between the HA module 630 and the PMA module 634 may include binding update triggers command from the HA module 630 to the PMA module 634 and forwarding of the $IP_2$ address from the PMA module 634 to the HA module 630.

Referring now to FIG. 13B, a functional block diagram of another exemplary implementation of an intermediate anchoring point 702 is presented. The intermediate anchoring point 702 includes the network processor 602, which may communicate with the firewall module 614 and the NAT module 618. The network processor 602 interfaces with the internal and external network interfaces 606 and 610.

The internal network interface 606 communicates with a switch fabric 706. In various implementations, the switch fabric 706 may be incorporated into the network processor 602 and additional internal network interfaces (not shown) may be added to the intermediate anchoring point 702. A PMA module 710 includes a network interface 712, which interfaces with the switch fabric 706. An HA module 720 includes a network interface 722, which also interfaces with the switch fabric 706.

The PMA module 710 and the HA module 720 may communicate with each other. This communication may be accomplished, for example, through a direct bus, a direct network connection, or via the switch fabric 706. The PMA module 710 and the HA module 720 can update a routing table 730 and a tunneling module 740 in the intermediate anchoring point 702.

While graphically depicted as separate connections, the PMA module 710 and the HA module 720 may communicate with the routing table 730 and the tunneling module 740 via the switch fabric 706 and the network processor 602. In various implementations, the PMA module 710 and the HA module 720 may be incorporated into the intermediate anchoring point 702. For example, FIG. 13A depicts a case where both the PMA module 710 and the HA module 720 are incorporated into the intermediate anchoring point 702.

Referring now to FIG. 14, a flowchart depicts exemplary steps performed by the first PMA 402. Control begins in step 802, where control determines where an access request has been received. If so, control transfers to step 804; otherwise, control transfers to step 806. In step 804, control contacts an AAA server to determine whether the terminal is authorized to attach. Control continues in step 808.

In step 808, if the AAA process determines that the terminal is authorized to attach, control continues in step 810; otherwise, control transfers to step 806. In step 810, control sends a binding update with the network address identifier of the terminal to the intermediate anchoring point. Control then continues in step 806.

In step 806, control determines whether a binding acknowledgement has been received. If so, control transfers to step 812; otherwise, controls transfers to step 814. In step 812, control sets up a tunnel to the home agent from which the binding acknowledgement was received. The home agent may be located in the intermediate anchoring point, and may share an IP address with the intermediate anchoring point. Control then continues in step 816, where the address received in the binding acknowledgement is assigned to the terminal. Control then continues in step 814.

In step 814, control determines whether a packet has been received from a terminal. If so, control transfers to step 818; otherwise, control transfers to step 820. In step 818, control encapsulates the packet and sends the encapsulated packet to the home agent. Control then continues to step 820. In step 820, control determines whether a packet has been received from the intermediate anchoring point. If so, control transfers to step 822; otherwise, control returns to step 802. In step 822, control decapsulates the packet and sends the packet to the destination address. The destination address will likely be that of the terminal. Control then returns to step 802.

Referring now to FIG. 15, a flowchart depicts exemplary steps performed by the intermediate anchoring point 330. Control begins in step 902, where control determines where a binding update has been received. If so, control transfers to step 904; otherwise, control transfers to step 906. In step 904, control allocates an IP address, $IP_1$, to the terminal that triggered the binding update.

Control then continues in step 908, where control determines whether the binding update includes an augmented network address identifier (NAI). If so, control transfers to step 910; if not, control transfers to step 912. An augmented NAI indicates that the ultimate home agent is not in the intermediate anchoring point 330. Therefore, in step 910, control determines the address of the ultimate home agent.

For example only, control may provide the NAI to an AAA server to determine the ultimate home agent address. In various implementations, control may perform this action even when the received NAI is not augmented. The intermediate anchoring point 330 may serve as a home agent in addition to providing hierarchical proxy mobility between a proxy mobility agent and another home agent. When binding updates are received for the intermediate anchoring point 330 acting as a home agent, the ultimate home agent address should resolve to the address of the intermediate anchoring point 330.

The augmented NAI may include a home agent identifier (HID), which may include a logical name or network address for the ultimate home agent. Control may resolve a logical name into a network address, such as by using a DNS query. The HID may already include the network address when the PMA sending the binding update has already performed this resolution.

Control continues in step 914, where a binding update is sent to the ultimate home agent, which may have been identified by an HID. The binding update may be sent with a source address of the address of the intermediate anchoring point 330, such as shown in FIG. 11A. Alternatively, the binding update may be sent with a source address of the allocated address, $IP_1$, such as is shown in FIG. 12A. Control then continues in step 906.

In step 912, the intermediate anchoring point 330 is the ultimate home agent, and so a binding acknowledgement is returned to the first PMA 402, PMA1, including the allocated address, $IP_1$. Control continues in step 906. In step 906, control determines whether a binding acknowledgement has been received. If so, control transfers to step 916; otherwise, control transfers to step 918.

In step 916, control stores the received IP address as $IP_2$. Control may create a table entry matching $IP_2$ with the PMA that originated the binding process, which is PMA1 in the example of FIG. 10. Control continues in step 920, where control sets up a tunnel between PMA2 and the sender of the binding acknowledgement, HA2. Control continues in step 922, where control sends a binding acknowledgment including $IP_2$ to PMA1. Controls continue in step 918.

In step 918, control determines whether an encapsulated packet has been received. If so, control transfers to step 924. Otherwise, control returns to step 902. In step 924, the packet is decapsulated. Control continues in step 926, where control determines if the destination of the packet is a terminal connected within the visited network. If so, control transfers to step 928; otherwise, control transfers to step 930. In step 926, control may check if the packet destination is any of the IP addresses, such as $IP_2$, assigned to terminals connected to the intermediate anchoring point 330.

In step 928, control encapsulates the packet and sends it to the appropriate PMA, which is PMA1 in the example of FIG. 10. Control then returns to step 902. In step 930, control encapsulates the packet and sends the packet to the appropriate home agent, which is HA2 in this example. Control then returns to step 902.

Referring now to FIG. 15B, a flowchart depicts exemplary steps performed by the intermediate anchoring point 330 where the intermediate anchoring point 330 presents an IP address for each connected terminal or PMA. In step 902, if control has received a binding update, control transfers to step 940; otherwise, control transfers to step 906.

In step 940, control allocates address $IP_1$ to the terminal that triggered the binding update. In various implementations, control allocates an IP address for each terminal connected to the intermediate anchoring point 330. In various other implementations, control allocates an IP address for each PMA. Addresses assigned to each PMA may be predetermined when each PMA is added to the visited network. Control then continues in step 908.

After step 910, control continues in step 942. In step 942, the binding update is sent to the ultimate home agent, which may have been specified by the HID. The source address for the binding update is $IP_1$, which corresponds to the terminal or to the PMA to which the terminal is attached. Control then continues in step 906.

If a binding acknowledgement is not received in step 906, control transfers to step 944. In step 944, control determines whether an encapsulated packet has been received from an internal PMA, such as PMA1. If so, control transfers to step 946; otherwise, control transfers to step 948. In step 946, control decapsulates the packet.

Control then continues in step 950, where control analyzes the source address of the decapsulated packet. In the present example, the decapsulated packet will have a source address of $IP_2$. This indicates to which home agent the packet should be tunneled. In addition, the source address $IP_2$ indicates which address should be used as the source when tunneling the packet to the home agent. In this example, the source address would be $IP_1$.

The source address could be determined without decapsulating the packet if $IP_1$ was allocated per PMA because the source address of the tunneled packet indicates the PMA's address, which corresponds to $IP_1$. However, the packet is already decapsulated to determine to which home agent the packet will be tunneled, which is based on the terminal's IP address, not the PMA's address.

Control then continues in step 952, where control encapsulates the packet and sends the packet to the ultimate home agent, HA2, and makes $IP_1$ the source address. Control then returns to step 902. In step 948, control determines whether an encapsulated packet has been received from an external home agent, such as HA2. If so, control transfers to step 954; otherwise, control returns to step 902. In step 954, control routes the packet to the appropriate PMA based on the destination address of the received encapsulated packet. The destination address is $IP_1$, which corresponds to a specific terminal or PMA. Control retains a mapping of $IP_1$ to PMA, so control can determine which internal PMA the encapsulated packet should be sent to without decapsulating the packet. Control then returns to step 902.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
   a first home agent configured to
      receive a first binding update message from an attachment point configured to communicate with a wireless terminal, and
      generate a trigger signal in response to receiving the first binding update message from the attachment point; and
   a proxy mobility agent configured to, in response to receiving the trigger signal from the first home agent,
      transmit a second binding update message to a second home agent;
      receive, in response to transmitting the second binding update message, a first binding acknowledgement message from the second home agent, wherein the first binding acknowledgement message includes an internet protocol (IP) address assigned to the wireless terminal by the second home agent; and
      forward the IP address from the first binding acknowledgement message to the first home agent,
   wherein the first home agent is configured to transmit a second binding acknowledgement message to the attachment point, and
   wherein the second binding acknowledgement message includes the IP address assigned to the wireless terminal.

2. The system of claim 1, wherein:
   the proxy mobility agent and the second home agent are configured to set up a first tunnel between the proxy mobility agent and the second home agent in response to the first binding acknowledgement message; and
   the first home agent and the attachment point are configured to set up a second tunnel between the first home agent and the attachment point in response to the second binding acknowledgement message.

3. The system of claim 2, wherein in response to the wireless terminal switching from the attachment point, the first tunnel remains unchanged between the proxy mobility agent and the second home agent.

4. The system of claim 1, wherein the attachment point is configured to transmit the first binding update message in response to successful authentication of the wireless terminal to the attachment point.

5. The system of claim 1, wherein the first home agent is configured to generate the trigger signal in response to determining that the second home agent is an ultimate home agent for the wireless terminal.

6. The system of claim 5, wherein the first home agent is configured to notify the proxy mobility agent of the ultimate home agent of the wireless terminal.

7. The system of claim 5, wherein the first home agent is configured to obtain an address of the ultimate home agent for the wireless terminal from an access, authentication, and accounting (AAA) server.

8. The system of claim 7, wherein the first home agent is configured to provide identification information of the wireless terminal to the AAA server.

9. The system of claim 8, wherein the identification information comprises at least one of a network address identifier or an international mobile subscriber identity.

10. A method comprising:
    receiving, at a first home agent, a first binding update message from an attachment point in response to the attachment point communicating with a wireless terminal;
    generating, at the first home agent, a trigger signal in response to receiving the first binding update message from the attachment point;
    transmitting, from a proxy mobility agent, in response to receiving the trigger signal from the first home agent, a second binding update message to a second home agent;
    receiving, at the proxy mobility agent, in response to transmitting the second binding update message, a first binding acknowledgement message from the second home agent, wherein the first binding acknowledgement message includes an internet protocol (IP) address assigned to the wireless terminal by the second home agent;
    forwarding the IP address from the first binding acknowledgement message to the first home agent; and
    transmitting, from the first home agent, a second binding acknowledgement message to the attachment point, wherein the second binding acknowledgement message includes the IP address assigned to the wireless terminal.

11. The method of claim 10, further comprising:
    setting up a first tunnel between the proxy mobility agent and the second home agent in response to the first binding acknowledgement message; and
    setting up a second tunnel between the first home agent and the attachment point in response to the second binding acknowledgement message.

12. The method of claim 11, further comprising, in response to the wireless terminal switching from the attachment point, maintaining the first tunnel between the proxy mobility agent and the second home agent.

13. The method of claim 10, further comprising transmitting the first binding update message from the attachment point in response to successful authentication of the wireless terminal to the attachment point.

14. The method of claim 10, further comprising generating the trigger signal in response to the first home agent determining that the second home agent is an ultimate home agent for the wireless terminal.

15. The method of claim 14, further comprising notifying, by the first home agent, the proxy mobility agent of the ultimate home agent of the wireless terminal.

16. The method of claim 14, further comprising obtaining, by the first home agent, an address of the ultimate home agent for the wireless terminal from an access, authentication, and accounting (AAA) server.

17. The method of claim 16, further comprising sending identification information of the wireless terminal from the first home agent to the AAA server.

18. The method of claim 17, wherein the identification information comprises at least one of a network address identifier or an international mobile subscriber identity.

\* \* \* \* \*